United States Patent

Eastman et al.

[11] Patent Number: 4,697,665
[45] Date of Patent: Oct. 6, 1987

[54] RECREATIONAL VEHICLE WITH AIR COOLED TRANSMISSION

[75] Inventors: Robert A. Eastman; Larry D. Rugland; Edwin M. Monsrud, all of Roseau, Minn.

[73] Assignee: Polaris Industries, Inc., Roseau, Minn.

[21] Appl. No.: 745,895

[22] Filed: Jun. 18, 1985

[51] Int. Cl.⁴ .............................................. F16H 57/04
[52] U.S. Cl. ................... 180/230; 74/606 A; 123/41.65; 123/195 C; 180/68.1; 180/225; 180/229; 180/311; 474/93; 474/146
[58] Field of Search ............... 180/230, 225, 229, 231, 180/217, 311, 309, 68.1, 68.2; 123/41.65, 195 C; 74/606 A; 474/93, 146, 13, 14

[56] References Cited

U.S. PATENT DOCUMENTS

| | | | |
|---|---|---|---|
| 438,644 | 10/1890 | Robertson | 474/146 X |
| 2,145,545 | 1/1939 | Johnson | 474/29 |
| 2,315,317 | 3/1943 | Copp | 474/93 |
| 2,707,402 | 5/1955 | Blair | 474/93 |
| 2,850,852 | 9/1958 | Hofberger | 51/135 R |
| 3,229,424 | 1/1966 | Fairchok | 51/148 |
| 3,650,344 | 3/1972 | Plessinger | 180/217 |
| 3,733,918 | 5/1973 | Domaas | 474/14 |
| 3,943,785 | 3/1976 | Percifield | 474/93 |
| 4,354,570 | 10/1982 | Tanaka | 180/219 |
| 4,531,928 | 7/1985 | Ikenoya | 474/93 |
| 4,597,466 | 7/1986 | Yamada | 180/225 |

FOREIGN PATENT DOCUMENTS

| | | | |
|---|---|---|---|
| 171825 | 7/1952 | Austria | 180/229 |
| 164051 | 6/1921 | United Kingdom | 180/225 |

Primary Examiner—David M. Mitchell
Assistant Examiner—Mitchell J. Hill
Attorney, Agent, or Firm—James R. Haller; Gregory P. Kaihoi

[57] ABSTRACT

A recreational vehicle having an enclosed, air cooled, variable speed, split sheave V-belt transmission. The transmission is enclosed by a housing having cooperatively located intake and exhaust ports connected respectively to intake and exhaust air conduits. One sheave of each pulley of the transmission includes a plurality of air propelling fins to generate air flow through the housing.

15 Claims, 7 Drawing Figures

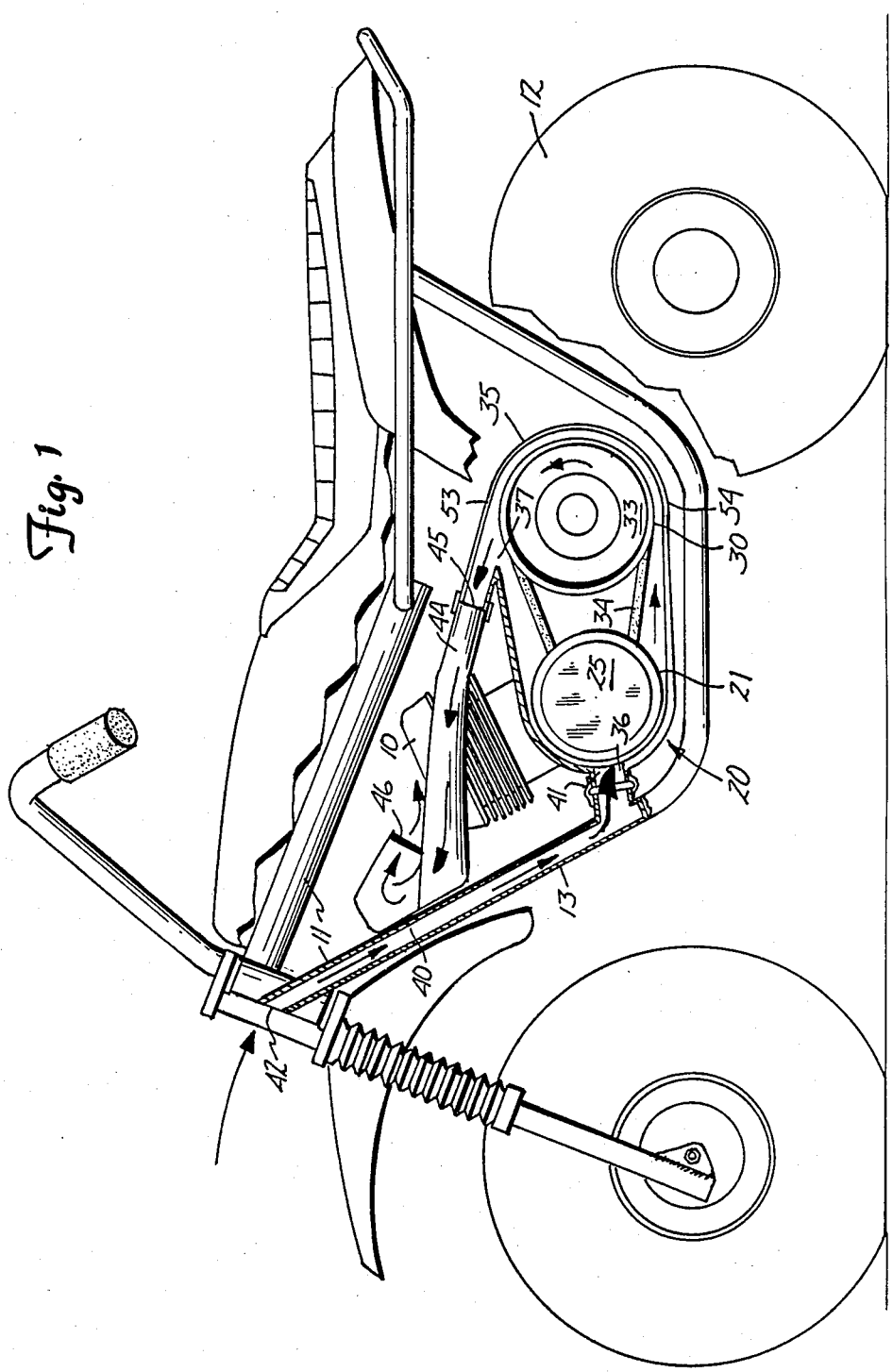

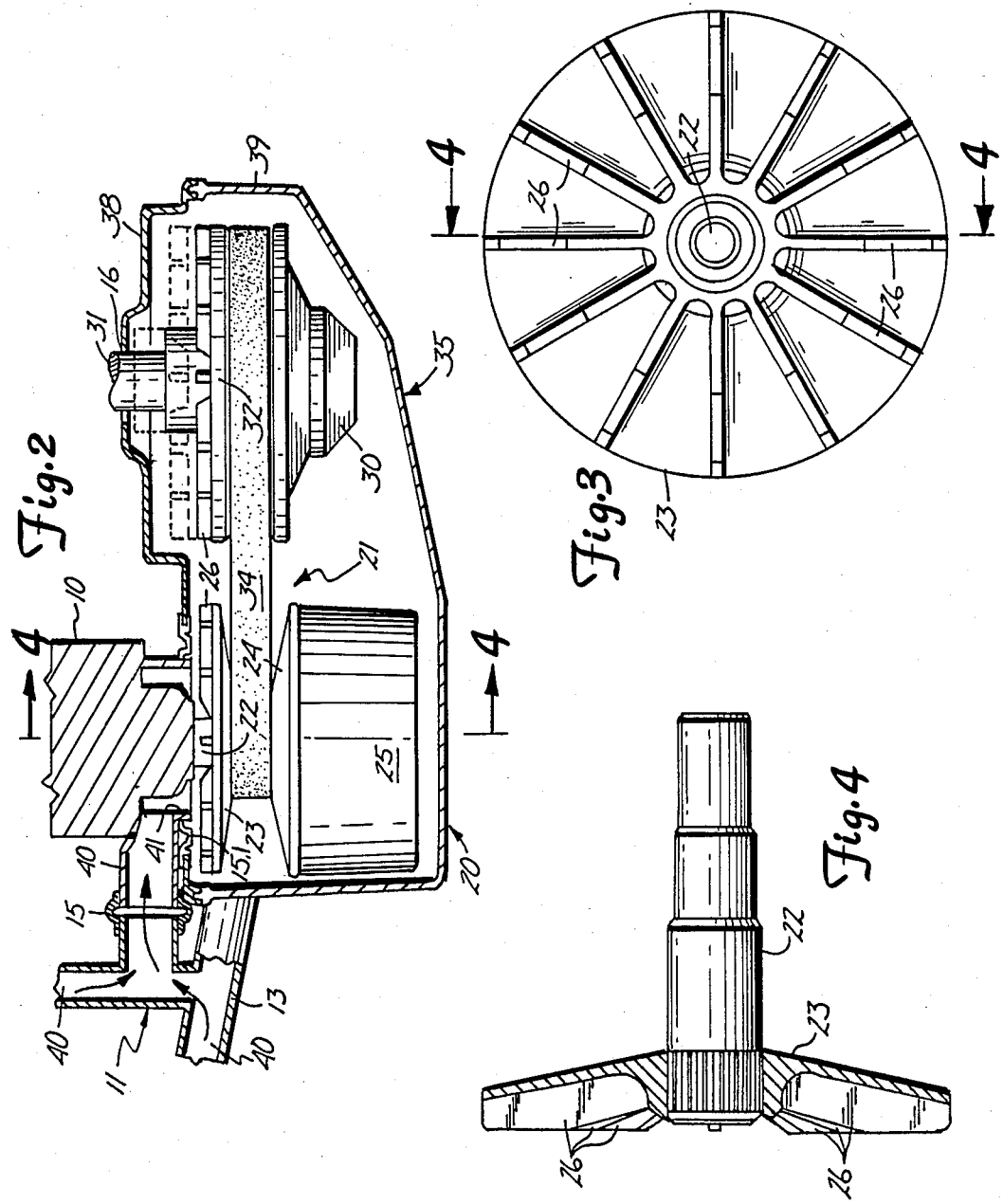

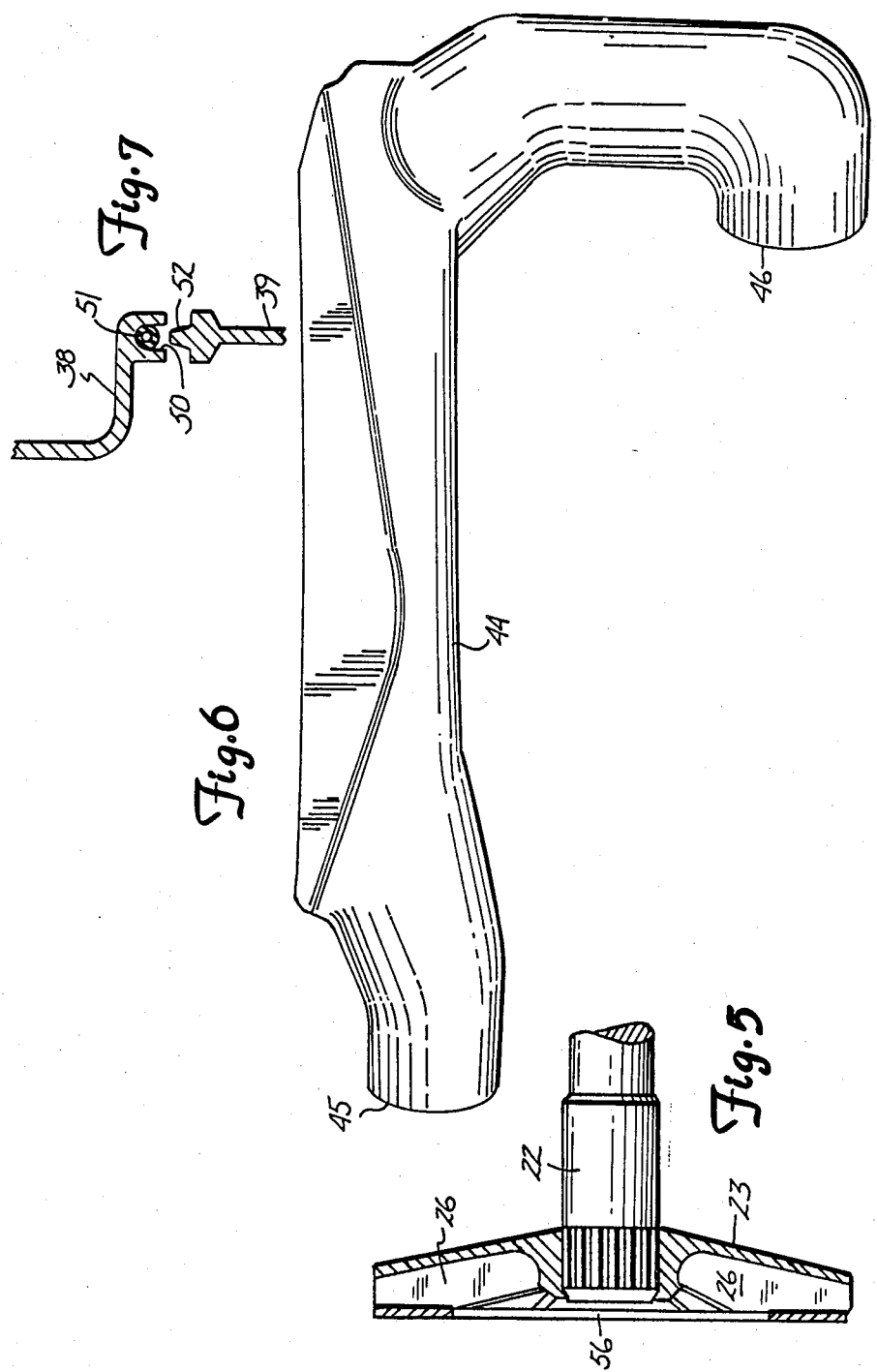

RECREATIONAL VEHICLE WITH AIR COOLED TRANSMISSION

TECHNICAL FIELD

The invention relates to motor-powered recreational vehicles, and in particular to the use of air-cooled variable speed transmissions on recreational vehicles.

BACKGROUND OF THE INVENTION

Recreational vehicles such as three-and four-wheeled "all terrain vehicles" ("ATV's") commonly are used on a variety of harsh terrains including sand, gravel, grass, snow, mud, dirt, and even shallow water. The vehicles generally are powered by internal combustion engines linked to the drive wheels by conventional gear trains.

Variable speed split sheave V-belt clutch transmissions are well known and frequently are used on snowmobiles. These transmissions are desirable for a variety of reasons including their "automatic" nature; i.e., the operator need not shift the transmission through a series of gears because it is automatically continuously variable, and may automatically disengage the drive train by releasing the V-belt during idling (i.e., below a predetermined RPM).

These V-belt transmissions would be desirable for use on all-terrain vehicles for the above-stated reasons. Because ATV's in fact are used on all types of terrain, the V-belt transmission would have to be protected from the obvious harm that mud, sand, and other debris would cause. Also, the V-belt should be kept dry to prevent slippage. Thus, the transmission should be entirely enclosed to keep it dry and clean. If the transmission is entirely enclosed, however, the heat generated by the V-belt cannot be effectively dissipated. Overheating may thus result, causing damage to either the V-belt or the transmission sheaves or both. By way of example, an enclosed transmission may heat up to about 200°-250° F. (90°-120° C.) while a typical V-belt will withstand only about 180° F. (about 80° C.). Overheating is most frequently encountered during high speed operation, but also is a problem under low speed/high load conditions such as are encountered in muddy or hilly terrains.

DISCLOSURE OF INVENTION

The invention provides a recreational vehicle having a frame, an engine mounted to the frame, driven wheels carried by the frame for propelling the vehicle, and variable speed transmission means for operatively linking the engine to the driven wheels. The transmission means includes a drive pulley and a driven pulley, each of which have a plurality of air-propelling fins on one face thereof. A housing encloses the transmission means, and has an intake port for admitting air and an exhaust port for exhausting air from the housing, the ports being oriented with respect to the pulleys to facilitate air movement through the housing.

Preferably, air conduit means is also provided to direct air toward and away from the respective ports. In a preferred embodiment the air conduit means comprises a portion of the vehicle frame which serves as an air intake tube connected to the intake port of the transmission housing. An air exhaust tube may also be provided and preferably is oriented to exhaust the air toward the engine to cool it. Preferably the intake and exhaust ends of the air conduit means are located in a relatively elevated, forward position with respect to the transmission means.

BRIEF DESCRIPTION OF DRAWINGS

FIG. 1 is a side elevational partially broken away view in partial cross-section of the recreation vehicle of the invention;

FIG. 2 is a cross-sectional plurality broken away view of the recreation vehicle of FIG. 1 taken along line 2—2 thereof;

FIG. 3 is an elevational view of a pulley sheave of the invention taken along line 3—3 of FIG. 2;

FIG. 4 is a cross-sectional view taken along line 4—4 of FIGS. 2-3;

FIG. 5 is a cross-sectional view, similar to FIG. 4, showing a modified embodiment;

FIG. 6 is a broken-away view of an exhaust tube of the invention; and

FIG. 7 is a broken-away cross-sectional view of a portion of FIG. 2.

BEST MODE FOR CARRYING OUT THE INVENTION

FIG. 1 shows a representative three-wheeled recreational vehicle having a frame (11) to which are mounted an engine (10) and driven wheels (12) linked to the engine (10) by transmission means (20). The transmission means includes a variable speed, split-sheave V-belt transmission of the type commonly used on snowmobiles. Such a split-sheave variable speed transmissions are well known in the art and need not be described in detail. See, e.g., U.S. Pat. No. 3,733,918, Domass.

The transmission (20) includes a drive pulley (21), a driven pulley (30), and a endless V-belt (34). Each pulley includes a pair of sheaves, one of which is axially movable. Each sheave has a tapered, V-belt engaging side and a backside facing away from the V-belt. The drive pulley (21) is connected by its drive shaft (22) directly to the engine (10). The pulley (21) is comprised of an inner axially stationary sheave (23) having a plurality of circumferentially open, air-propelling fins (26) on its backside, and an axially movable outer sheave (24) carrying the variable speed mechanism shown generally as (25). Similarly, the driven pulley (30) includes a driven shaft (31), and a pair of sheaves (32) and (33), the inner sheave (32) having a plurality of air-propelling fins (26) on its backside. The driven shaft (31) is mechanically linked to the driven wheels (12); this linkage is not shown for purposes of clarity, but may include a conventional foreward-neutral-reverse gearbox.

To protect the transmission from water and debris, the transmission (20) is enclosed within a housing (35). The housing (35) has an intake port (36) and exhaust port (37) to facilitate the movement of cooling air through the housing (35). An intake tube (40) and exhaust tube (44) desirably are provided to supply and exhaust air to and from the housing (35).

The air intake tube (40) can be configured in a variety of ways. As shown in FIGS. 1-2, the frame (11) is used as the tube (40). The frame (11) includes a pair of descending, divergent tubes (13) and a connecting crosspiece or yoke (14). The second tube (13) is directly behind the first in FIG. 1, and therefore not visible in this drawing. Alternately, the intake tube (40) could comprise an air passageway totally separate from the vehicle frame (11). In liquid-cooled vehicles, the air intake might be combined with an air passage for the coolant radiator. Similarly, air supply to the carburetor might be combined with the transmission air intake, and an additional air filter can be employed to clean the air. Corresponding variations for the exhaust tube (44) can also be used.

Although a variety of configurations for these tubes (40) and (44) are possible, preferably they both terminate in a relatively elevated and forward position. The elevated, forward position is advantageous for a number of reasons. First, assuming other parts of the recreational vehicle are constructed to be water-resistant, a relatively high position allows the vehicle to go through fairly deep areas of water without admitting moisture into the transmission housing (35). Second, the forward position is desirable because in deep water the rear end of the vehicle tends to submerge before the front end. Third, the forward position of the intake end (42) of the intake tube (40) reduces the likelihood that dust, dirt and other foreign material kicked up by the vehicle itself will enter the intake tubes. Finally, the exhaust end (46) of the exhaust tube (44) is desirably oriented, as shown in FIG. 1, to exhaust cooling air onto the engine (10).

Although the exhaust air exiting the transmission housing (35) may be relatively warmer than ambient air, it is nevertheless somewhat cooler than the engine (10). The volume of air passing through the transmission housing (35) is rather large, and therefore the air directed at the engine (10) contributes significantly to engine (10) cooling. For example, it has been found that engine (10) temperature may be lowered by as much as about 50° F. (about 28° C.) by directing the exhaust air at the engine block (10).

The connections shown in FIGS. 1 and 2 between the transmission housing (35), the frame (11) and the engine (10) should be sealed against intrusion of foreign matter. This can be accomplished by appropriate bellows (15) and (15.1) and gasket material (16) as shown in the drawings. The bellows (15) and (15.1) may be constructed of high temperature neoprene or other suitable rubber. It functions not only to seal the housing (35) but also to allow limited movement (vibration) of the engine with respect to the housing (35). This an important function because, although the housing is mounted rigidly to the vehicle frame (11), the engine is mounted on conventional motor mounts which allow limited vibrating movement. Thus, the bellows (15) and (15.1) acts as a damper or buffer to prevent engine vibration from being transmitted to the housing (35).

The housing (35) may be made of any suitable material including metal, fiberglass, or nylon. Desirably, however, the housing (35) comprises a tough, shatter resistant material to guard the operator against injury in the event there is an internal failure of the transmission. One material which has given good results is a tough nylon sold by Dupont under the trademark Zytel 901.

Preferably the housing (35) includes two detachable, complimentary parts, one of which is removeable for ease of servicing. The parts should be sealed to one another to resist entry of foreign matter. A preferred means for accomplishing this is shown in enlarged detail in FIG. 7. The non-removable part (38) of the housing includes a channel (50) around its periphery. This channel (50) carries a flexible tube (51) against which the flange (52) of the removable part (39) of the housing (35) sealably engages. The use of a hollow, flexible tube (51) rather than a solid material allows for greater flexing and movement of the housing parts with respect to one another without compromising the seal.

To facilitate flow of air through the transmission housing (35), the intake (36) and exhaust (37) ports of the housing (35) should be cooperatively located. In the preferred embodiment shown in the drawings, the intake port (36) is located adjacent the backside of the inner drive pulley sheave (23) intermediate the center and periphery of the sheave (23). The fins (26) of the sheave (23) act as a squirrel cage fan, accelerating air centrifugally and directing it to the rear of the transmission (20). The sheave (23) therefore creates a low pressure zone near its center. Desirably the intake port (36) is located near this low pressure zone, thereby enhancing air flow. Preferably the port (36) is not farther from the axis of the sheave (23) than a distance equal to about one-half of the radius of the sheave (23).

The radial air-propelling fins (26) of the driven pulley (30) likewise accelerate air centrifugally, and, in cooperation with the housing (35), rotationally. As air is accelerated rotationally, the housing (35) exerts a centripetal force on it unit it reaches the exhaust port (37). As can be seen in FIG. 1, the exhaust port (37) preferably is located radially outwardly of and approximately tangential to the driven pulley (30). Circumferentially, the port (37) desirably is at or near the downstream end (53) of an approximately semi-circular arc defined by the portion of the housing (35) that closely encloses roughly half the circumference of the sheave (30). Preferably the port (37) is located closer to the downstream end (53) than to the upstream or beginning (54) of the defined arc. Thus, the port (37) releases accelerated air from the housing (35) at a point of relatively high directionality and velocity.

A variety of fin (26) configurations may be employed. FIGS. 3-4 show the preferred detail of the fins (26) on the inner sheave (23) of the drive pulley (21). The fins are radial, straight, and extend perpendicular to the backside of the sheave (23). Performance of the fins can be improved by aerodynamically curving them in various configurations, but such enhancements may give only marginal improvement in performance in relation to the additional complications of manufacture. Desirably the fins are cast integrally with the sheave. Although the fins could be separately manufactured and attached to the sheave (23), casting them integrally with the sheave (23) simplifies assembly and promotes efficient dissipation of heat through the fins (26).

To enhance directionality of air flow generated by the fins (26), preferably the fins are spaced only a short distance from the housing (35). The drive pulley (21) shown in FIG. 2 has its inner, stationary sheave (23) located close to the wall of the housing (35). The inner movable sheave (32) of the driven pulley (30) is spaced slightly from the housing wall when the transmission (20) is in low speed position, but the sheave (26) approaches the housing (35) closely when the transmission (20) is in the high speed position (i.e., when the sheaves of the driven pulley (30) are separated, and the sheaves of the drive pulley (30) are compressed). Thus, the sheave (26) is in an optimum position when maximum cooling is required.

In another embodiment, a washer-like ring (56) can be fastened to the fins as shown in FIG. 5. This ring, like the housing wall (35), defines radial passages between the fins (26) to enhance directionality and speed of air flow.

Fins (26) also can be provided on the outer sheave of one or both of the pulleys. In the embodiment shown in the drawings, however, it has been found that such additional fins may generate excess turbulence within the transmission housing (35), and that effective ventilation and cooling is accomplished with fins (26) on only one sheave of each of the pulleys (21) and (30). By way of example, under test conditions the embodiment in the drawings has generated exhaust air speeds of up to 75 m.p.h., reducing the interior temperature of the transmission from about 200°–250° F. to about 125° F.

Although some ventilation would be accomplished by having fins (26) on only one of the pulleys, to assure adequate cooling under both high speed and low speed/high load conditions, utilizing fins (26) on both pulleys gives particularly good results. In FIGS. 1–2 the transmission is in the low speed/high load position; the drive pulley (21) spins relatively faster than the driven pulley (30) and thus is responsible for a relatively larger proportion of air movement through the housing (35). Conversely, when the sheaves of the drive pulley (21) are compressed in the high speed position, the sheaves of the driven pulley (30) separate so that the V-belt (34) has a smaller radius around the driven pulley (30) than the drive pulley (21). Thus, the driven pulley (30) will rotate relatively faster than the drive pulley (21) and be responsible for relatively more of the air movement through the housing (35). Providing fins (26) on both the drive pulley (21) and the driven pulley (30) therefore promotes efficient cooling and ventilation of the transmission (20) under both low speed/high load and high speed conditions.

In operation, at low and idle speeds the driven pulley (30) will be turning only very slowly or not at all, generating little or no air flow. The drive pulley (21) will be turning at least at a moderate rate, however, generating sufficient air flow to cool the transmission (20) effectively. As vehicle speed increases, the distance between the drive pulley (21) sheaves decreases, effectively increasing the radius about which the V-belt (34) travels; the driven pulley (30) sheaves simultaneously separate, decreasing the effective radius of the pulley (30). The driven pulley (30) therefore accelerates faster than the drive pulley (21), inducing significant air flow through the housing at higher speeds. The speed of the drive pulley (21) is always a function of engine rpm, while the speed of the driven pulley (30) is proportional to vehicle speed. Thus, including fins on both pulleys assures effective ventilation and cooling at low vehicle speeds and even greater air flow generated by the driven pulley (30) at high vehicle speeds.

Small amounts of moisture may enter the housing (35), but will quickly evaporate. Large amounts of water, which may even substantially fill the housing, (e.g. if the vehicle is driven through deep water) can be effectively eliminated from the housing (39). The operator can shift the vehicle to neutral and then rev the engine. The fins on the pulleys will blow the water out and dry the housing compartment.

The utility of such a system is underscored by its simplicity of function and manufacture. The fins (26) preferably are cast integrally with the respective pulley sheaves, and require no additional assembly. Besides the pulley fins, no moving parts are added. If the vehicle frame (11) is used as the intake tube (40) the only parts added to the vehicle are the housing (with appropriate bellows and seals) and the exhaust tube (44). Thus, the invention provides highly effective protection for the transmission (20) at relatively low cost and with simplicity of manufacture, assembly and maintenance.

While a preferred embodiment of the present invention has been described, it should be understood that various changes, adaptations and modifications may be made therein without departing from the spirit of the invention and the scope of the appended claims.

What is claimed is:

1. A vehicle comprising a frame; an engine mounted to the frame; driven wheels carried by the frame for propelling the vehicle; variable speed transmission means for operatively linking the engine to the driven wheels, said transmission means including a drive pulley and a driven pulley each having a pair of sheaves and one of each pair of sheaves having a plurality of air-propelling fins on the back side thereof, and a housing enclosing said transmission means, the housing having an intake port for admitting air therein and an exhaust port for exhausting air therefrom, said ports being oriented with respect to the pulleys to facilitate air movement through the housing; and air conduit means sealingly engaged to the ports for directing air toward and away from the respective ports, said air conduit means including an exhaust tube having a first end sealingly engaged to the housing exhaust port and a second end oriented in a relatively high position with respect to the variable speed transmissiona means.

2. The vehicle of claim 1 wherein the air conduit means includes an intake tube having a first end sealingly engaged to the housing intake port and a second end oriented to inhibit entry of foreign material.

3. The vehicle of claim 1 wherein the second end of the intake tube is located in a relatively elevated forward position with respect to the transmission means.

4. The vehicle of claim 1 wherein the intake tube comprises a part of the vehicle frame.

5. The vehicle of claim 1 wherein the intake port is located adjacent the backside of the drive pulley inner sheave near the center of said sheave.

6. The vehicle of claim 5 wherein the intake port is located within a distance of about one-half the radius of the sheave from the sheave axis.

7. The vehicle of claim 1 wherein the exhaust port is located radially outwardly of the driven pulley and oriented approximately tangential thereto in the direction of air flow about the driven pulley, and wherein the exhaust tube extends, for at least a portion of its length, away from the exhaust port in generally the same tangential direction.

8. The vehicle of claim 7 wherein the housing defines an approximately semicircular arc about the periphery of the driven pulley, said arc having a beginning and an end defined by the rotational direction of the pulley, the exhaust port being located near the end of said arc.

9. A vehicle comprising a frame, an engine mounted to the frame, driven wheels carried by the frame for propelling the vehicle, and variable speed transmission means for operatively linking the engine to the driven wheels, said transmission means including:

a drive pulley and a driven pulley each having a pair of sheaves, one of each pair of sheaves having a plurality of fins on the backside thereof;

a housing enclosing said transmission means and having an intake port for admitting air therein, and an exhaust port for exhausting air therefrom, the intake port being located adjacent to the backside and near the center of the drive pulley, and the exhaust port being located radially outwardly of the drive pulley and oriented approximately tangential thereto in the direction of air flow about the driven pulley; and air conduit means for directing air toward and away from the respective ports, said means including an intake tube having a first end sealingly engaged to the housing intake port and a second end oriented to inhibit entry of foreign matter, and an exhaust tube having a first end sealingly engaged to the housing exhaust port and a second end oriented in an elevated position with respect to the exhaust port, the exhaust tube extending, for at least a portion of its length immediately adjacent the exhaust port, in generally the same tangential direction as the exhaust port.

10. The vehicle of claim 9 wherein the intake tube comprises a part of the vehicle frame, the second end of said tube being located in a relatively high, forward position with respect to the variable speed transmission means.

11. The vehicle of claim 9 wherein the housing defines an approximately semicircular arc about the periphery of the driven pulley, said arc having a beginning and an end defined by the rotational direction of the pulley, the exhaust port being located near the end of said arc.

12. The vehicle of claim 9 wherein the respective finned sheaves are located relatively closely adjacent to the housing when the vehicle is traveling at high speeds.

13. The vehicle of claim 9 wherein the finned sheave of the drive pulley is located relatively closely adjacent to the housing.

14. The vehicle of claim 9 wherein the second end of the exhaust tube is oriented generally forwardly of the exhaust port to inhibit entry of foreign material.

15. The vehicle of claim 9 wherein the second end of the exhaust tube is oriented to exhaust the air toward the engine.

* * * * *

UNITED STATES PATENT AND TRADEMARK OFFICE
CERTIFICATE OF CORRECTION

PATENT NO. : 4,697,665

DATED : October 6, 1987

INVENTOR(S) : ROBERT A. EASTMAN, LARRY D. RUGLAND, and EDWIN M. MONSRUD

It is certified that error appears in the above—identified patent and that said Letters Patent is hereby corrected as shown below:

Column 2, line 8, replace "plurality" with --partially-- .

Column 4, line 22, replace "unit" with --until-- .

Signed and Sealed this

Sixteenth Day of February, 1988

Attest:

DONALD J. QUIGG

Attesting Officer

Commissioner of Patents and Trademarks